Feb. 13, 1934.  P. B. CAMP  1,947,403
SLACK ADJUSTER FOR RAILWAY BRAKES
Filed July 12, 1928  2 Sheets-Sheet 2
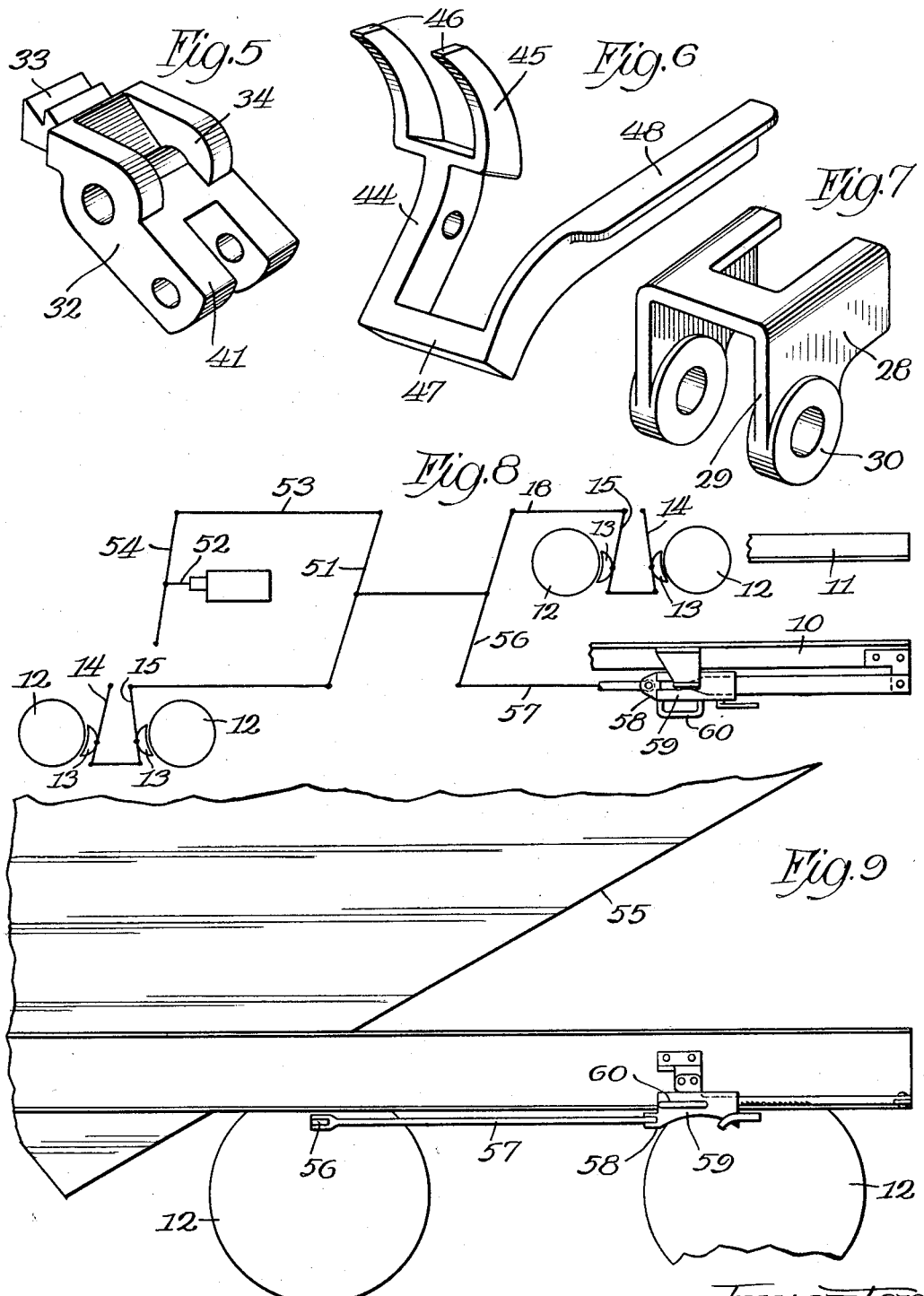

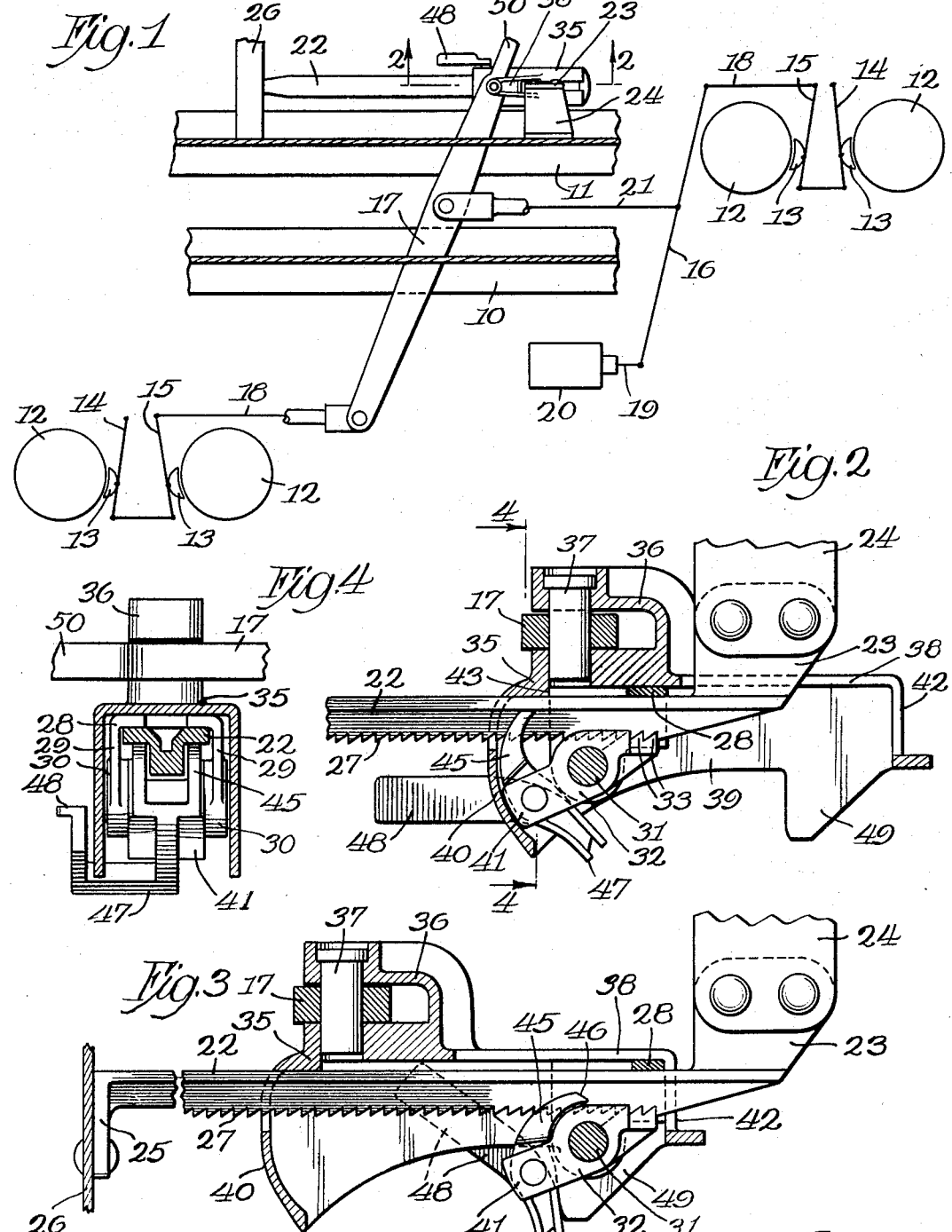
Feb. 13, 1934. P. B. CAMP 1,947,403
SLACK ADJUSTER FOR RAILWAY BRAKES
Filed July 12, 1928 2 Sheets-Sheet 1
Inventor
Percy B. Camp,
By Wilson, Mann & Cox, Attys.

Patented Feb. 13, 1934

1,947,403

UNITED STATES PATENT OFFICE 1,947,403

SLACK ADJUSTER FOR RAILWAY BRAKES

Percy B. Camp, Maywood, Ill., assignor to Universal Draft Gear Attachment Co., a corporation of Illinois Application July 12, 1928. Serial No. 292,085

17 Claims. (Cl. 188—200)

Air brake mechanisms are designed to operate best when the brakes are applied by a selected length of piston travel. In service, however, wear on the brake shoes for the most part, but to some extent in other parts, increases the necessary piston travel; and when new brake shoes are installed the piston travel is again reduced.

It is the principal object of this invention to enable the mechanism to be adjusted to compensate for wear and for new brake shoes. Other objects and advantages of the invention will become apparent as the disclosure proceeds and the description is read in connection with the accompanying drawings, in which Fig. 1 is a diagrammatic view illustrating an application of the invention to a conventional form of foundation brake gear in common use on freight cars;

Figs. 2 and 3 are similar sectional views through a slack adjuster made in accordance with this invention, and are taken on the line 2—2 of Fig. 1;

Fig. 4 is a transverse section taken on the line 4—4 of Fig. 2;

Figs. 5, 6 and 7 are perspective views of a pawl, a pawl lock, and a saddle forming parts of the slack adjuster;

Fig. 8 is a view similar to Fig. 1, illustrating the application of the invention to a conventional foundation brake gear in common use on hopper cars, and Fig. 9 is a side elevation of part of a hopper car further illustrating this application of the invention.

But this specific illustration and the correspondingly specific description are used for the purpose of disclosure only, and are not intended to impose limitations on the scope of the patent, for it is realized that the substance of the invention may be embodied in a variety of other forms.

Referring now to Fig. 1, 10 and 11 indicate the center sills of the car underframe, mounted on trucks including wheels 12 to which brake shoes 13 are applied by dead levers 14 and live levers 15, receiving power from live cylinder lever 16 and dead cylinder lever 17, through connections 18. One end of the live cylinder lever 16 is operatively connected with the piston rod 19 of an air cylinder 20, and it transmits power to the dead cylinder lever through the cylinder lever connection 21.

Similar mechanisms are in common use and various forms may be selected to suit particular car service.

The specific attachment used to illustrate the preferred form of this invention is best shown in Figs. 2, 3 and 4, and takes the place of the ordinary fixed fulcrum for the dead cylinder lever 17. It includes a rack 22 having one end upturned at 23 and secured to the center sill 11 by a bracket 24. The other end (Fig. 3) is bent laterally to form an arm 25, which is secured to a cross sill 26. The body portion of the rack is T-shaped in cross section, as best illustrated in Fig. 4, and the teeth 27 are carried at the bottom of the leg of the T.

Mounted astride the rack, and capable of moving back and forth thereon, is a traveling part, best illustrated in the perspective view Fig. 7, and which, for convenience, is called a saddle 28. Its side portions 29 depend below the rack and are provided with perforated bosses 30 to receive the pivot pin 31, by which the holding pawl 32, best shown in Fig. 5, is mounted. The toe end of the pawl 32 is provided with teeth 33 for cooperating with the teeth 27 of the rack, and its intermediate portion is provided with flanges 34 to provide strength and give clearance for the rack teeth 27.

Riding on the saddle and having limited lengthwise movement with respect to it, is an elongated element 35 called, for convenience, a rider, which includes a jaw 36 to which the fulcrum end of the dead cylinder lever 17 is pivoted by a pin 37. To the right of the jaw, in Fig. 2, the body portion of the rider is extended in the form of a divided plate 38 and depending from this plate and the jaw is a skirt 39, the front portion 40 of which is curved to form a housing for the heel 41 of the pawl 32.

In Fig. 2 the parts are shown in the relation they normally assume in use. To adjust the mechanism to compensate for wear, and reduce the piston travel to normal it is only necessary to move the fulcrumed end of the dead lever 17 to the left in Figs. 1, 2 and 3. The first effect of this movement is to slide the rider 35 along the rack bar 22 and over the saddle 28 until the right end 42 of the skirt 39 strikes the corresponding end of the saddle 28, as illustrated in Fig. 3. This movement corresponds to the normal piston travel and if the brakes were in adjustment it would press the shoes firmly against the wheels, and no further movement to the left could be given. When there is excess slack, however, further movement of the rider to the left will cause the saddle to also move to the left and the pawl to clatter over the teeth 27 until the brake shoes are pressed firmly against the wheels, when the pawl will seize the rack and thereby hold the parts in that adjusted position. The rider will then return to the right until the shoulder 43, at its left end, strikes the corresponding end of the saddle 28.

It will thus be seen that the adjustment is effected by shifting the fulcrum of the dead cylinder lever, but the invention makes it necessary to account for the normal piston travel before making any lasting change in the position of the fulcrum.

The operation may be repeated as frequently as desirable and the rack is of sufficient length to permit all the necessary adjustment to compensate for wear on the shoes and other parts.

In Fig. 1 the dead cylinder lever 17 is shown equipped with a handle 50 adapted to be grasped by the operator in making the adjustment.

When new shoes are to be installed it is, of course, necessary to shift the fulcrum of the dead cylinder lever to the right again, and this may be accomplished by releasing the pawl from the rack 27. The new brake shoes are then installed and afterwards the operation first above described is performed in order to adjust the mechanism for use.

Rough handling of cars in making up trains might release the pawl and permit the adjustment to be lost. For that reason means have been provided to lock the pawl until such time as it is released on the proper authority.

The heel 41 of the pawl is split and perforated, and the shank 44 of the pawl lock, best illustrated in Fig. 6, is pivoted to it. Above the shank the lock is provided with two curved arms 45 which bear at their ends 46 on the underside of the head of the rack, and the parts are so proportioned that the lock acts as a strut extending between the heel of the pawl and the rack, and preventing the toe from being released from the teeth 27.

Below the pivot the shank 44 is bent laterally at 47 and then to the left in Fig. 2 to provide a handle 48, which extends substantially horizontal, and is of sufficient weight to press the ends 46 against the underside of the rack, and make a binding connection.

The skirt 39 of the rider 35 is provided with a projection 49 adapted to strike the portion 47 of the pawl lock when the rider is moved to the left in Fig. 2, and under continued pressure this will cause the pawl lock to be thrown to the position shown in Fig. 3, thereby permitting the pawl to clatter over the teeth 27 until the proper position of adjustment is reached. Upon release from the hands of the operator the rider will automatically move to the right in Fig. 3, and the pawl lock will automatically drop from the position shown in Fig. 3 to the position shown in Fig. 2, and lock the pawl.

When new shoes are to be installed the pawl lock may be released by grasping the handle 48 and swinging it to the position shown in Fig. 3, and it will also serve as a handle by which the pawl may be released.

Referring to Fig. 8, it will be seen that the live cylinder lever 51 is not acted upon directly by the piston rod 52, but receives power through the connection 53 from the auxiliary lever 54, which is acted upon by the piston rod.

This change is made in order to locate the brake cylinder beneath the inclined wall 55 (Fig. 9) of the car body and permit the contents of the car to be discharged through a suitable opening including that portion of the car where the air brake cylinder is usually located.

For similar reasons the slack adjuster made according to this invention is not applied directly to the dead cylinder lever 56, but is connected with it by a rod 57 (Fig. 8). This form of the device may be the same in all respects as that described in connection with Figs. 1, 2 and 3, except that the jaw 58, corresponding to the jaw 36, projects from the lower left end of the rider 59, and the side of the rider is provided with a handle 60 to be grasped in shifting the parts to make the adjustment. In the illustration, (Figs. 8 and 9) the adjustment is performed by moving the rider to the right instead of to the left, as in the other figures.

I claim as my invention:

1. In a foundation brake gear including a live cylinder lever and a dead cylinder lever, the combination of means to adjust the brake gear to compensate for wear including a relatively fixed rack, a saddle movable along the rack, a pawl carried by the saddle and engaging the rack, a pawl lock carried by the pawl for engaging the rack to prevent release of the pawl, a rider having limited movement with respect to the saddle and a fulcrum on the rider for the dead cylinder lever.

2. In a foundation brake gear, including a live cylinder lever and a dead cylinder lever, the combination of means to adjust the brake gear to compensate for wear including a relatively fixed rack, a saddle movable along the rack, a pawl carried by the saddle and engaging the rack, a pawl lock pivotally mounted on the pawl, a rider having limited movement with respect to the saddle and a fulcrum on the rider for the dead cylinder lever.

3. In a foundation brake gear, including a live cylinder lever and a dead cylinder lever, the combination of means to adjust the brake gear to compensate for wear including a relatively fixed rack, a saddle movable along the rack and having side portions depending at each side thereof, a pawl pivoted between the side portions of the saddle and engaging the rack to secure the saddle in place, means to lock the pawl against casual release, a rider on the saddle, and a fulcrum for the dead lever on the rider.

4. In a foundation brake gear including a live cylinder lever and a dead cylinder lever, the combination of means to adjust the brake gear to compensate for wear including a relatively fixed rack, a saddle movable along the rack, a pawl pivotally mounted on the saddle having a toe to engage the rack and a heel projecting beyond the pivot, a pawl lock cooperating with the heel to prevent disengagement of the toe from the rack, a rider having limited movement with respect to the saddle and a fulcrum on the rider for the dead cylinder lever.

5. An attachment for brake gears including a guide adapted to be made fast to a car, a saddle on the guide, means for securing the saddle to the guide in a plurality of positions, a rider on the saddle having portions lying fore and aft of the saddle adapted to engage the saddle whereby the rider has limited movement on the saddle corresponding to normal piston travel, and a fulcrum carried by the rider.

6. An attachment for brake gears including a guide adapted to be made fast to a car, a rack on the guide, a saddle on the guide, a pawl on the saddle adapted to engage the rack, a pawl lock supported by the pawl and adapted to engage the guide and hold the pawl in engagement with the rack, a rider on the saddle and a fulcrum for a dead cylinder lever on the rider.

7. In a foundation brake gear including a live cylinder lever and a dead cylinder lever, the combination of means to adjust the brake gear to compensate for wear including a relatively fixed rack, a saddle movable along the rack, a pawl carried by the saddle and engaging the rack, gravity operative means for locking the pawl, a rider having limited movement with respect to the saddle and a fulcrum on the rider for the dead cylinder lever.

8. In a foundation brake gear including a live cylinder lever and a dead cylinder lever, the combination of means to adjust the brake gear to compensate for wear including a relatively fixed rack, a saddle movable along the rack, a gravity operated and locked pawl securing the saddle to the rack, a rider having limited movement with respect to the saddle and a fulcrum on the rider for the dead cylinder lever.

9. In a foundation brake gear including a live cylinder lever and a dead cylinder lever, the combination of means to adjust the brake gear to compensate for wear including a fixed guide, a saddle adjustable along the guide, gravity operative means normally holding the saddle fixed with respect to the guide, a rider having limited movement with respect to the saddle and a fulcrum on the rider for the dead lever.

10. In a foundation brake gear including a live cylinder lever and a dead cylinder lever, the combination of means to adjust the brake gear to compensate for wear including a relatively fixed rack, a fulcrum for the dead cylinder lever mounted for movement relative to the rack, a pawl engaging the rack, a gravity operative lock for the pawl, and means carried by the fulcrum for releasing said lock when the fulcrum is moved relative to the rack a distance corresponding to normal piston travel.

11. In a foundation brake gear including a live cylinder lever and a dead cylinder lever, the combination of means to adjust the brake gear to compensate for wear including a relatively fixed rack, a pawl mounted on the rack for movement relative thereto, a gravity operative lock carried by the pawl for locking the pawl in adjusted position, a shiftable fulcrum for the dead lever, and means carried by the fulcrum for first automatically releasing the pawl lock and then moving the pawl along the rack whenever the fulcrum is moved a distance greater than normal piston travel.

12. In a foundation brake gear including a live cylinder lever and a dead cylinder lever, the combination of means for adjusting the brake gear to compensate for wear including a relatively fixed rack, a pawl movable along the rack, a lock for the pawl, a fulcrum for the dead cylinder lever movable along the rack, said pawl lock being adapted to be manually released at any given position of the fulcrum and automatically released when the fulcrum is moved a distance along the rack corresponding to normal piston travel.

13. In a foundation brake gear including a live cylinder lever and a dead cylinder lever, the combination of means for adjusting the brake gear to compensate for wear including a relatively fixed rack, a saddle movable along the rack, a pawl carried by the saddle and engaging the rack, a gravity operative pawl lock carried by the pawl and having an arm engaging a portion of the rack, a rider having a limited movement with respect to the saddle and adapted to release the pawl lock upon a given movement of the rider, and a fulcrum on the rider for the dead cylinder lever.

14. In a foundation brake gear including a live cylinder lever and a dead cylinder lever, the combination therewith of means for adjusting the brake gear to compensate for wear including a shiftable fulcrum for the dead cylinder lever, and a gravity operative positive lock for maintaining the fulcrum in adjusted position.

15. In a foundation brake gear including a live cylinder lever and a dead cylinder lever, the combination therewith of means for adjusting the brake gear to compensate for wear including a shiftable fulcrum for the dead cylinder lever, and a gravity operative positive lock for maintaining the fulcrum in adjusted position, said lock being adapted to be manually released at any given position of the fulcrum.

16. In a foundation brake gear including a live cylinder lever and a dead cylinder lever, the combination therewith of means for adjusting the brake gear to compensate for wear including a shiftable fulcrum for the dead cylinder lever, and a gravity operative positive lock for maintaining the fulcrum in adjusted position, said lock being adapted to be manually released at any given position of the fulcrum, and automatically released when the fulcrum is moved a distance corresponding to normal piston travel.

17. In a foundation brake gear including a live cylinder lever and a dead cylinder lever, the combination of means to adjust the brake gear to compensate for wear including a relatively fixed rack, a fulcrum for the dead cylinder lever mounted for movement relative to the rack, a pawl engaging the rack, and a separately mounted gravity operative lock for the pawl.

PERCY B. CAMP.